US008305374B2

(12) United States Patent
Lee

(10) Patent No.: US 8,305,374 B2
(45) Date of Patent: Nov. 6, 2012

(54) DISPLAY DEVICE HAVING PRECHARGE OPERATIONS AND METHOD OF DRIVING THE SAME

(75) Inventor: Jae Han Lee, Chungcheongnam-Do (KR)

(73) Assignee: Samsung Display Co., Ltd. (KR)

( * ) Notice: Subject to any disclaimer, the term of this patent is extended or adjusted under 35 U.S.C. 154(b) by 722 days.

(21) Appl. No.: 12/072,092

(22) Filed: Feb. 22, 2008

(65) Prior Publication Data

US 2008/0303809 A1 Dec. 11, 2008

(30) Foreign Application Priority Data

Jun. 8, 2007 (KR) ........................ 10-2007-0056168

(51) Int. Cl.
*G06F 3/038* (2006.01)

(52) U.S. Cl. .......................................... 345/215; 345/89

(58) Field of Classification Search .................... 345/89, 345/213–215
See application file for complete search history.

(56) References Cited

U.S. PATENT DOCUMENTS

| | | | | |
|---|---|---|---|---|
| 6,700,562 | B1 | 3/2004 | Knapp et al. | |
| 2003/0006955 | A1* | 1/2003 | Tsuchi | 345/92 |
| 2003/0132903 | A1* | 7/2003 | Ueda | 345/87 |
| 2004/0080522 | A1* | 4/2004 | Nitta et al. | 345/690 |
| 2006/0066548 | A1* | 3/2006 | Yoneyama et al. | 345/89 |
| 2006/0256065 | A1* | 11/2006 | Jung | 345/100 |
| 2006/0291309 | A1* | 12/2006 | Maki | 365/203 |

FOREIGN PATENT DOCUMENTS

| | | |
|---|---|---|
| JP | 2001-022328 A | 1/2001 |
| JP | 2001-166741 A | 6/2001 |
| JP | 2001-296840 | 10/2001 |
| JP | 2002-149125 | 5/2002 |
| JP | 2003-255917 | 9/2003 |
| JP | 2005-37833 | 2/2005 |
| JP | 2006-53252 | 2/2006 |
| JP | 2006-99850 | 4/2006 |
| JP | 2007-053460 A | 3/2007 |

(Continued)

OTHER PUBLICATIONS

English Language Abstract, Publication No. JP2001296840, Oct. 26, 2001, 1 p.

(Continued)

*Primary Examiner* — Chanh Nguyen
*Assistant Examiner* — Long D Pham
(74) *Attorney, Agent, or Firm* — Innovation Counsel LLP

(57) ABSTRACT

Disclosed are a display and a method of driving the display. The display includes a display panel on which a plurality of data lines are formed, a data driver for supplying data voltages generated by modulating input image data to the respective data lines. The data driver includes a precharging unit for selecting a specific precharge voltage from a plurality of precharge voltages applied to the data driver depending on grayscale sections of the input image data, and for precharging the selected precharge voltages to the respective data lines.

A predetermined voltage is precharged according to a grayscale section of image data and then applied to a pixel, whereby voltage rising time and voltage falling time when charging the pixel can be shortened. Therefore, even though the charge time of the pixel is shortened and bias current of the data driver is thus reduced, it is possible to obtain high driving performance. In addition, since the bias current of the data driver is reduced, overall current consumption is reduced and heat generation can also be suppressed.

6 Claims, 5 Drawing Sheets

FOREIGN PATENT DOCUMENTS

| | | |
|---|---|---|
| KR | 2002-0057036 | 7/2002 |
| KR | 2002-0084933 | 11/2002 |
| KR | 2005-0051311 | 6/2005 |
| KR | 2006-0103081 | 9/2006 |
| KR | 2007-0000880 | 1/2007 |

OTHER PUBLICATIONS

English Language Abstract, Publication No. JP2002149125, May 24, 2002, 1 p.

English Language Abstract, Publication No. JP2003255917, Sep. 10, 2003, 1 p.

English Language Abstract, Publication No. JP2005037833, Feb. 10, 2005, 1 p.

English Language Abstract, Publication No. JP2006053252, Feb. 23, 2006, 1 p.

English Language Abstract Publication No. JP2006099850, Apr. 13, 2006, 1 p.

Korean Patent Abstracts, Publication No. 1020020057036, Jul. 11, 2002, 1 p.

Korean Patent Abstracts, Publication No. 1020020084933, Nov. 16, 2002, 1 p.

Korean Patent Abstracts, Publication No. 1020050051311, Jun. 1, 2005, 1 p.

Korean Patent Abstracts, Publication No. 1020060103081, Sep. 28, 2006, 1 p.

Korean Patent Abstracts, Publication No. 1020070000880, Jan. 3, 2007, 1 p.

* cited by examiner

DISPLAY DEVICE HAVING PRECHARGE OPERATIONS AND METHOD OF DRIVING THE SAME

CROSS REFERENCE TO RELATED APPLICATION

This application claims priority from Korean Patent Application No. 10-2007-0056168 filed on Jun. 8, 2007 in the Korean Intellectual Property Office, the disclosure of which is incorporated herein by reference in its entirety.

BACKGROUND OF THE INVENTION

1. Field of the Invention

The present invention relates to a display and a method of driving the display.

2. Description of the Related Art

A liquid crystal display is one of various types of display devices. In a liquid crystal display, liquid crystal material is interposed between two substrates having electrodes thereon, and different voltages are applied to the two substrates to generating an electric field, so that alignment of the liquid crystal molecules is controlled. Accordingly, light transmissivity is controlled, whereby the liquid crystal display displays images.

The liquid crystal display includes a plurality of pixels in which a pixel electrode, red R, green G and blue B color filters are formed. The pixels are driven by control signals supplied through signal lines to display images. The signal lines include a gate line through which gate signal (or scan signal) is transmitted, and a data line through which data signal (or grayscale signal) is transmitted. A thin film transistor connected to one gate line and one data line is disposed in each pixel. The voltage level of the data signal is changed according to image data, and the gate signal is used to turn on or off the thin film transistor. The data signal is supplied to the pixel electrode to charge the pixel while the thin film transistor is turned on, so that the transmissivity of liquid crystal is controlled and desired images are displayed.

The gate signal (or gate voltage) and the data signal (or data voltage) are supplied through a gate driving chip connected to the respective gate lines and a data driving chip connected to the respective data lines. In general, the data driving chip includes a more complicated inner circuit compared to the gate driving chip. Current consumption of the data driving chip is therefore generally larger than that of the gate driving chip. In addition, as a demand for displays having fine pitch and high resolution has increased recently, the number of required pixels and an amount of image data to be processed has also increased. For this reason, current consumption of the data driving chip is also increasing rapidly. For example, a liquid crystal display of a full high definition (FHD) grade which is of current interest, requires a processing ability for image data having much higher bits (about 8 bits or more) compared to a conventional liquid crystal display. For this reason, the current consumption of the FHD liquid crystal display has increased. Further, in some liquid crystal displays, pixels are driven at a frequency of 120 Hz, which is about twice the typical frequency, in order to increase the response speed. The time allocated for charging the data signal is thus reduced due to the high speed driving. Thereby, bias current of the data driver needs to be increased to attain a desirable display quality. As a result, the current consumption is increased. Further, malfunction of the chips is more likely due to a heat generation caused by the increased current consumption, so that the chips are damaged resulting in a higher defect ration for the displays.

SUMMARY OF THE INVENTION

An aspect of an embodiment of the present invention provides a display capable of reducing a voltage rising time and a voltage falling time while charging a pixel by precharging a predetermined voltage depending on a grayscale section of image data and then applying the precharged voltage to a pixel, and a method of driving the same.

Another aspect of an embodiment of the invention provides a display that can improve driving performance without increasing current consumption by substantially reducing the charging time of a pixel and can preserve a desirable display quality even during high speed driving, and a method of driving the display.

According to an exemplary embodiment of the invention, a display includes: a display panel on which a plurality of data lines are formed; a data driver for supplying data voltages generated by modulating input image data to the respective data lines, wherein the data driver is supplied with a plurality of precharge voltages and includes a precharging unit for selecting a specific precharge voltage from the plurality of precharge voltages depending on grayscale section of the input image data, and for precharging the selected precharge voltage to the corresponding data line.

The data driver may include a decoder unit that modulates the input image data into data voltages suitable for driving the display panel, and an output buffer unit that applies the data voltages to the data lines. Further, the precharging unit may output a precharge voltage between the decoder unit and the output buffer unit.

The data driver may further include a precharge capacitor connected to a front end of the output buffer unit.

The display may further include a grayscale reading unit that controls the selection pattern of the precharging unit depending on the grayscale sections of the input image data.

The grayscale reading unit controls the selection pattern of the precharging units depending on high n bits of the input image data. For example, the grayscale reading unit may read a high 1 bit of the input image data, and control the selection pattern of the precharging unit. That is, the precharging unit may select a low grayscale precharge voltage when the high 1 bit of the input image data is “0”, and may select a high grayscale precharge voltage when the high 1 bit of the input image data is “1”. In this case, the low grayscale precharge voltage may have a voltage level corresponding to a middle grayscale in a low grayscale section, and the high grayscale precharge voltage may have a voltage level corresponding to a middle grayscale in a high grayscale section.

The display may further include a grayscale voltage generator for outputting a plurality of voltages generated by a voltage dividing unit to the data driver. The precharging unit may use a part of the plurality of voltages as the plurality of precharge voltages.

The precharging unit may be provided in plurality of sections corresponding in number to the number of data lines.

The display panel includes a liquid crystal layer.

According to another exemplary embodiment of the invention, a method of driving a display on which a plurality of data lines are formed includes: receiving image data from outside; generating data voltages by modulating the input image data; selecting one of a plurality of precharge voltages depending on a grayscale section of the input image data; and supplying the selected precharge voltage and the data voltage to a corresponding data line.

In the selecting step, one of the plurality of precharge voltages may be selected depending on a grayscale section read from high n bits of the input image data. For example, a low grayscale precharge voltage may be selected when the high 1 bit of the input image data is read as a "0", and a high grayscale precharge voltage may be selected when the high 1 bit of the input image data is read as a "1". In this case, the low grayscale precharge voltage may have a voltage level corresponding to a middle grayscale in a low grayscale section, and the high grayscale precharge voltage may have a voltage level corresponding to a middle grayscale in a high grayscale section.

In the supplying step, the selected precharge voltage may be supplied to a corresponding data line ahead of the data voltage.

The method of driving the display may further include generating a plurality of voltages for displaying grayscales by dividing a reference voltage received from outside. A part of the plurality of voltages may be used as the plurality of precharge voltages.

BRIEF DESCRIPTION OF THE DRAWINGS

The above and other features and advantages of the invention will become more apparent in light of the following detailed description of the preferred embodiments thereof with reference to the attached drawings in which.

DESCRIPTION OF THE PREFERRED EMBODIMENTS

Figure 1:
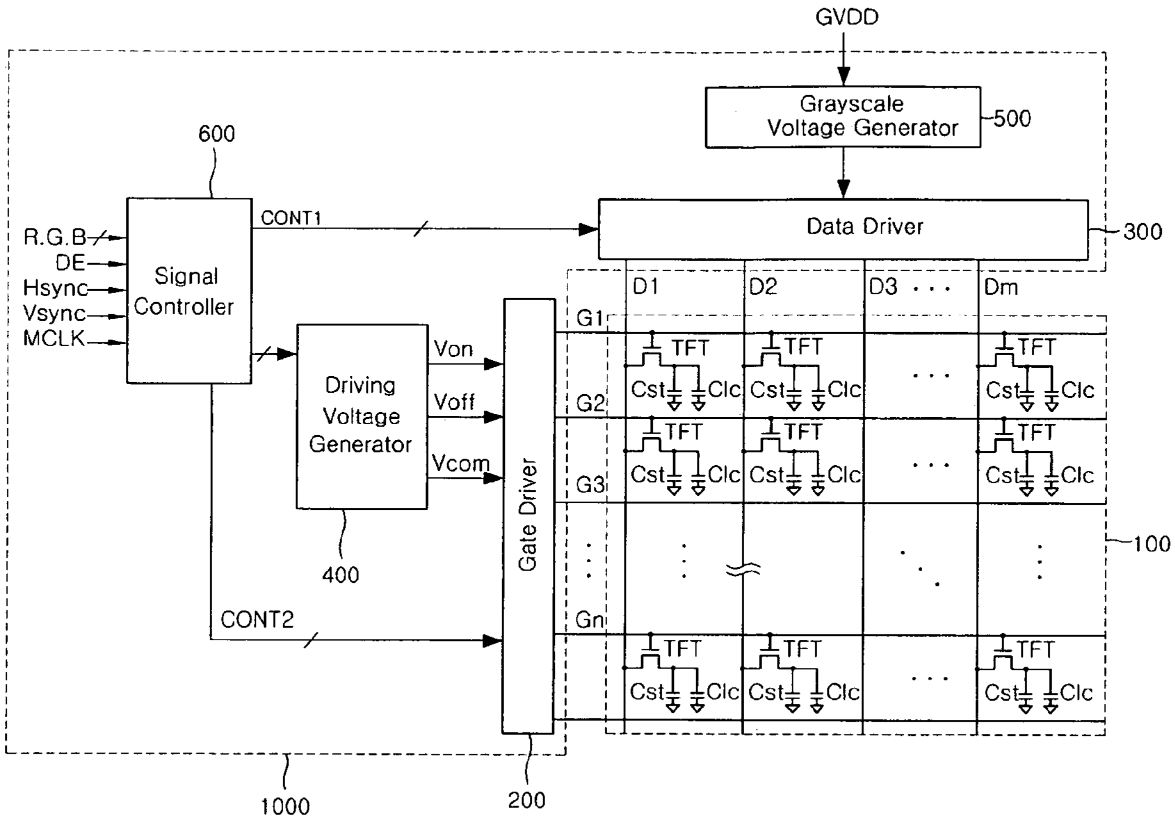
FIG. 1 is a block diagram of a liquid crystal display according to an embodiment of the invention.

Hereinafter, exemplary embodiments of the present invention are described in detail with reference to the accompanying drawings.

However, the invention is not limited to the following embodiments. Further, the invention may be embodied in many different forms and should not be construed as being limited to the embodiments set forth herein. Rather, these embodiments are provided so that this disclosure will be thorough and complete and will fully convey the concept of the invention to those skilled in the art. Like reference numerals refer to like elements in drawings. The terminology used herein is for the purpose of describing particular embodiments only and is not intended to be limiting of the invention. As used herein, the singular forms "a", "an" and "the" are intended to include the plural forms as well, unless the context clearly indicates otherwise.

Figure 2:
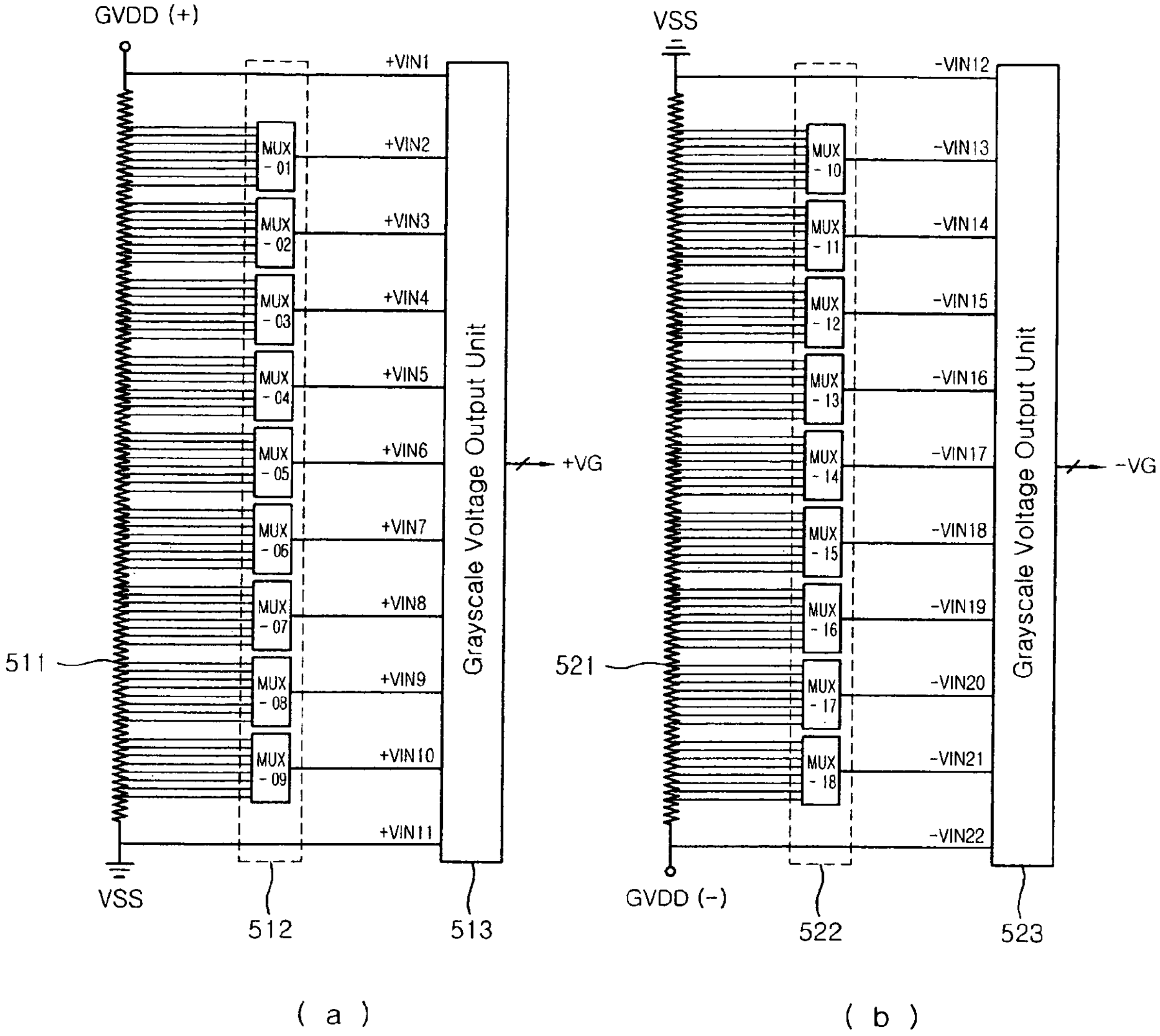
FIG. 2 is a combination circuit and block diagram of a grayscale voltage generator according to the embodiment of the invention.

FIG. 1 is a block diagram of a liquid crystal display according to an embodiment of the invention, and FIG. 2 is a combination block and circuit diagram of a grayscale voltage generator according to the embodiment of the invention.

Referring to FIG. 1, a liquid crystal display according to an embodiment of the invention includes a liquid crystal display panel 100 on which a plurality of pixels are arranged in a matrix form, and a liquid crystal driving circuit 1000 for controlling the pixels. The liquid crystal driving circuit 1000 includes a gate driver 200, a data driver 300, a driving voltage generator 400, a grayscale voltage generator 500, and a signal controller 600 for controlling the units. The data driver 300 supplies data signals corresponding to image data R, G, and B to the respective pixels. In this case, the data driver 300 supplies predetermined voltages that are precharged as a function of the respective grayscale sections of the image data to the pixels together with data signals.

The liquid crystal display panel 100 includes a plurality of gate lines G1 to Gn extending in one direction, a plurality of data lines D1 to Dm extending in another direction to intersect the gate lines, and a plurality of pixels provided at intersections of the lines. There are provided a thin film transistor TFT, a liquid crystal capacitor Clc, and a storage capacitor Cst in each pixel. In this case, gate terminals of the thin film transistors TFT are connected to the gate lines G1 to Gn, and source terminals thereof are connected to the data lines D1 to Dm. Further, drain terminals thereof are connected to the pixel electrodes (not shown) of the liquid crystal capacitors Clc. The thin film transistor TFT operates on the basis of a gate turn-on voltage Von applied to the gate line G1 to Gn, and transmits data signal from the data line D1 to Dm to the liquid crystal capacitor Clc and the storage capacitor Cst. The liquid crystal capacitor Clc includes a pixel electrode, a common electrode facing the pixel electrode, and a liquid crystal layer interposed therebetween as a dielectric layer. When the thin film transistor TFT is turned on, a data signal is charged in the liquid crystal capacitor to control the arrangement of molecules in the liquid crystal layer. The storage capacitors Cst includes a pixel electrode, a storage electrode facing the pixel electrode, and a protective layer interposed therebetween as a dielectric layer. The storage capacitor keeps the data signal charged in the liquid crystal capacitor Clc, until the next data signal is charged in the liquid crystal capacitor. The storage capacitor Cst which is supplemental to the liquid crystal capacitor Clc may be omitted. It is preferable that each pixel specifically displays one of the three primary colors (red, green, blue). For this purpose, each pixel is provided with a color filter. Further, a black matrix for preventing light leakage is provided between the pixels.

There is provided a liquid crystal driving circuit 1000 including a signal controller 600, a driving voltage generator 400, a gate driver 200, a grayscale voltage generator 500, a the data driver 300 outside the liquid crystal display panel 100. Parts of the liquid crystal driving circuit 1000, for example, the gate driver 200 and the data driver 300, may be provided outside the display region of the liquid crystal display panel 100. In such an embodiment, the gate driver 200 and the data driver 300 may be directly formed on a lower substrate of the liquid crystal display panel 100 (ASG method), or manufactured separately so that they can be mounted on the lower substrate using well known methods such as the COB (Chip On Board) method, the TAB (Tape Automated Bonding) method, or the COG (Chip On Glass) method. The gate driver 200 and the data driver 300 in this exemplary embodiment may be manufactured as one or more chips and mounted on the lower substrate. Further, the driving voltage generator 400 and the signal controller 600 may be mounted on a printed circuit board (PCB) and connected to the gate driver 200 and the data driver 300 through a flexible printed circuit (FPC) so as to be electrically connected to the liquid crystal display panel 100.

The signal controller 600 receives an input image signal and an input control signal from an external graphic controller (not shown). For example, the signal controller receives an input image signal including image data R, G and B, and an input control signal including a vertical synchronization signal Vsync, a horizontal synchronization signal Hsync, a main clock MCLK, and a data enable signal DE.

The signal controller 600 processes the input image signal based on the operational condition of the liquid crystal display panel 100, and generates internal image data R, G, and B. Further, the signal controller 600 generates a gate control signal CONT1 and a data control signal CONT2, and then transmits the gate control signal CONT1 to the gate driver 200, and transmits the image data R, G, and B and the data control signal CONT2 to the data driver 300. The image data R, G, and B are rearranged according to the arrangement of the pixels in the liquid crystal display panel 100, and may be corrected by an image correction circuit. The gate control signal CONT1 may include a vertical synchronization start signal STV for instructing start of output of the gate turn-on voltage Von, a gate clock signal CPV, and an output enable signal OE. The data control signal CONT2 may include a horizontal synchronization start signal STH for indicating start of transmitting of the image data, a load signal LOAD for instructing supplying the data signal to a corresponding data line, and an inversion signal RVS for instructing inversion of the polarity of a grayscale voltage with respect to a common voltage, and a data clock signal DCLK.

The driving voltage generator 400 can generate and output various driving voltages required for driving the liquid crystal display panel 100 by using power input from an external power source. For example, the driving voltage generator 400 generates a gate turn-on voltage Von for turning on the thin film transistor TFT and a gate turn-off voltage Voff for turning off the thin film transistor TFT, and supplies them to the gate driver 200. Further, the driving voltage generator 400 generates a common voltage Vcom, and supplies the common voltage to the common electrode and the storage electrode.

The gate driver 200 starts operation according to the vertical synchronization start signal STV. Further, the gate driver 200 is synchronized with the gate clock signal CPV, so that the gate driver sequentially outputs analog gate signals including the gate turn-on voltage Von and the gate turn-off voltage Voff, which are input from the driving voltage generator 400, to a plurality of gate lines G1 to Gm disposed in the liquid crystal display panel 100. In this case, gate turn-on voltage Von may be output in a high period of the gate clock signal CPV, and the gate turn-off voltage Voff may be output in a low period of the gate clock signal CPV. The gate driver 200 may include: a shift register unit for sequentially generating a scan pulse in response to the gate control signal CONT1 which is transmitted from the signal controller 600; and a level shifter unit for increasing the scan pulse voltage to a desirable level for driving the pixels.

Referring to FIG. 2, the grayscale voltage generator 500 divides a gamma voltage GVDD input from an external power source in order to generate grayscale voltages VG having various levels, and then supplies the grayscale voltages to the data driver 300. The grayscale voltage generator 500 includes: a voltage dividing unit 511 and 521 for generating a plurality of divided voltages using the gamma reference voltage GVDD; a multiplexing unit 512 and 522 for selecting a part of the divided voltages to output as a plurality of gamma voltages VIN; and a grayscale voltage output unit 513 and 523 for generating a plurality of grayscale voltages VG using the plurality of gamma voltages VIN and outputting the grayscale voltages. The voltage dividing unit 511 and 521 may include a string of resistors connected in series between the gamma reference voltage GVDD and the ground voltage VSS. Further, variable resistors may be connected in series between the resistors in the string, so that the dividing interval of the gamma voltages VIN can be finely controlled. The multiplexing unit 512 and 522 includes a plurality of multiplexers MUX. Each multiplexer MUX selects one of the divided voltages input, and outputs the selected voltage as gamma voltages VIN2 to VIN8. In this case, the highest and the lowest divided voltages may be directly output as the highest and the lowest gamma voltages without passing through the multiplexing units 512 and 522. The grayscale voltage output unit 513 and 523 generates and outputs a plurality of grayscale voltages VG using the gamma voltages VIN to be input. The number of the grayscale voltages VG may be changed according to the number of bits forming image data R, G, and B. For example, when the image data R, G, and B is formed of 8 bits, 256 grayscale voltages VG1 to VG256 may be generated and output.

In particular, the grayscale voltage generator 500 shown in FIG. 2 generates a pair of grayscale voltages having different polarities, i.e., a positive grayscale voltage +VG and a negative grayscale voltage −VG, and supplies the grayscale voltages to the data driver 300. The grayscale voltage generator 500 according to this exemplary embodiment includes a positive grayscale voltage generator (see FIG. 2(*a*)) which outputs first to 256th positive grayscale voltages +VG1 to +VG256, and a negative grayscale voltage generator (see FIG. 2(*b*)) which outputs first to 256th negative grayscale voltages −VG1 to −VG256. Although the grayscale voltage generator 500 has been separately provided outside the data driver 300 in this exemplary embodiment, the invention is not limited thereto, and the grayscale voltage generator may be built into data driver 300 to be described below.

The data driver 300 converts digital image data R, G, and B into analog data using the grayscale voltages VG generated by the grayscale voltage generator 500, and applies the converted analog data to the data lines D1 to Dm as data signals DS (DS1 to DSm). In this case, the data signals DS may be generated using the positive grayscale voltages +VG or the negative grayscale voltages −VG, and may be supplied to the data lines D1 to Dm with changed polarity according to the inversion signal RVS of the signal controller. The configuration and operation of the data driver 300 according to this exemplary embodiment is described in detail below.

Figure 3:
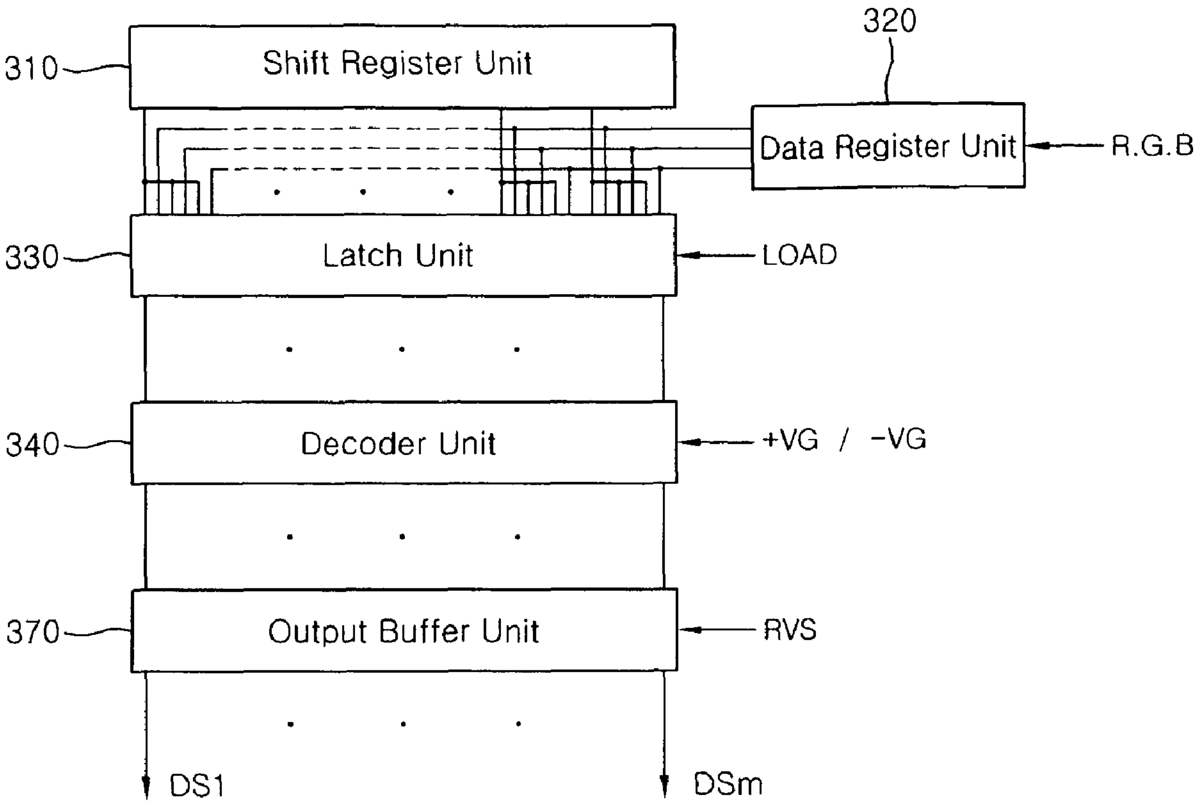
FIG. 3 is a block diagram of a data driver according to the embodiment of the invention.

FIG. 3 is a block diagram of a data driver according to the embodiment of the invention.

Referring to FIG. 3, the data driver 300 includes a shift register unit 310 for sequentially transmitting sampling signals, a data register unit 320 for temporarily storing image data R, G, and B, a latch unit 330 for sampling and latching the image data R, G, and B by the sampling signals, a decoder unit 340 for modulating the latched image data R, G, and B into the data signals DS and outputting the data signals, and an output buffer unit 370 for supplying the data signals DS to the data lines D1 to Dm.

In this case, the shift register unit 310 generates a sampling signal based on the data control signal CONT2 supplied from the signal controller 600, and supplies the sampling signal to the latch unit 330. That is, the shift register unit 310 starts operation according to the horizontal synchronization start signal STH indicating start of input of the image data R, G, and B corresponding to one line. Further, the shift register unit outputs the sampling signal generated by synchronizing with a data clock signal DCLK. The data register unit 320 temporarily stores the image data R, G, and B that is sequentially input from the signal controller 600. The latch unit 330 samples the image data R, G, and B which is temporarily stored in the data register unit 320 in response to the sampling signal of the shift register unit 310, and then latches the sampled data. The latch unit 330 simultaneously latches image data R, G, and B corresponding to one line, that is, image data R, G, and B corresponding to each data line D1 to Dm, according to the load signal LOAD, and then outputs the latched data. The decoder unit 340 modulates digital image data into analog data using a plurality of grayscale voltages, and then outputs the analog data as data signals. The output buffer unit 370 amplifies the data signals DS generated by the decoder unit 340, and then supplies the amplified signals to the data lines D1 to Dn. In this case, the output buffer unit 370 may include a plurality of amplifiers AMP.

Figure 4:
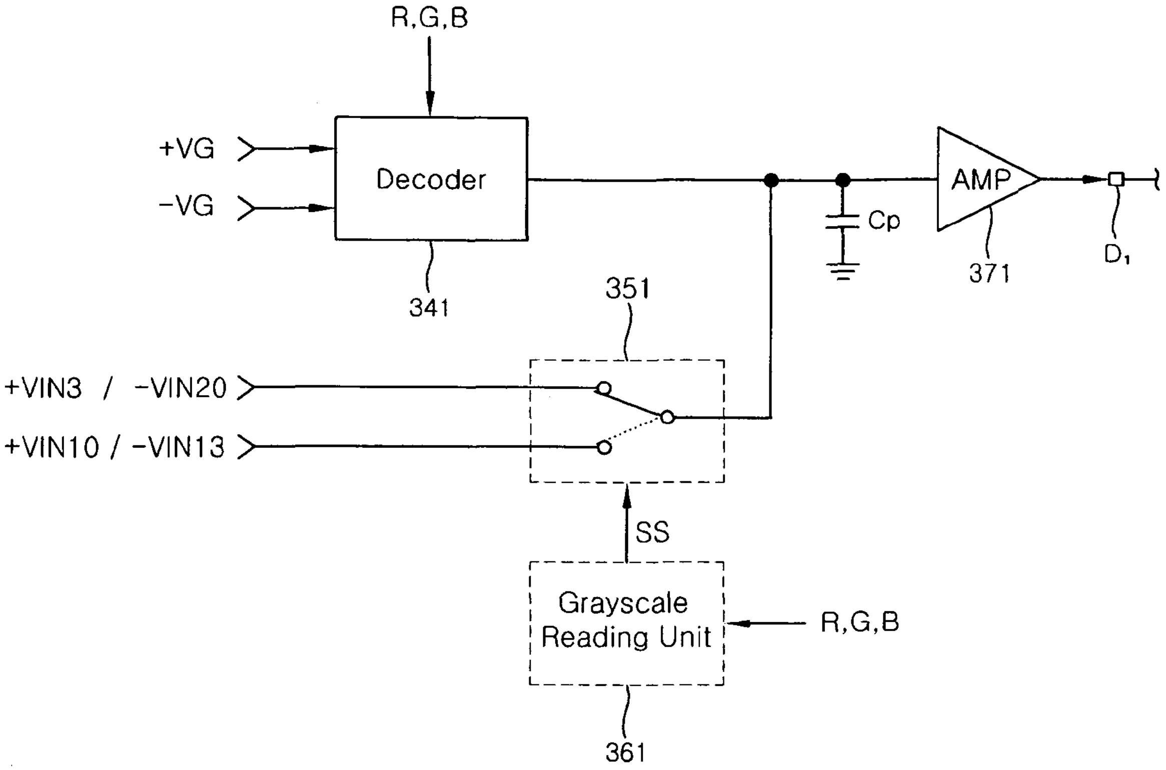
FIG. 4 is a block diagram of an output part of the data driver according to the embodiment of the invention.

Meanwhile, FIG. 4 is a block diagram of an output part of the data driver according to an exemplary embodiment of the invention, and illustrates the configuration and operation of an output circuit of the data driver 300 connected to the first data line D1.

Referring to FIG. 4, the data driver 300 according to this exemplary embodiment includes a precharging unit 351 and a grayscale reading unit 361 for controlling the precharging unit. Before the data signal DS is supplied or when the data signal DS is initially supplied, the precharging unit 351 precharges a predetermined voltage corresponding to the grayscale section of the image data R, G, and B to the data line D1. In this case, the precharging unit 351 is connected to an output of each decoder 341 and precharges a predetermined voltage. The precharging unit may be provided between the decoder 341 and an output buffer unit 371 and precharge a predetermined voltage to the data line D1. Although the grayscale reading unit 361 is provided in the data driver 300 in this embodiment, the present invention is not limited thereto, and the grayscale reading unit may also be provided in another module, for example, the signal controller 600. A plurality of precharging units 351 and a plurality of grayscale reading units 361 may be provided so as to precharge predetermined voltages to the plurality of data lines D1 to Dn. The configuration and operation of the grayscale reading unit 361 and the precharging unit 351 connected to the first data line D1 is described in detail below.

In general, a grayscale to represent the image data R, G, and B is represented by a digital binary number. For example, the lowest grayscale of 8-bit image data having 256 grayscales, that is, a first grayscale (full black) is represented by “00000000”. The highest grayscale thereof, that is, a 256th grayscale (full white) is represented by “11111111”. Accordingly, it is possible to find out which grayscale section among $2^n$ grayscale levels the corresponding image data R, G, and B belongs to by reading the high n bits of the image data R, G, and B. Therefore, the grayscale reading unit 361 reads which grayscale section among the $2^n$ grayscale levels the corresponding image data R, G, and B belongs to by reading the high m bits of the image data R, G, and B. (m is equal to or lower than n) Then, the grayscale reading unit 361 generates $2^m$ control signals SS according to the corresponding grayscale section based on the read result. For example, the grayscale reading unit 361 in this exemplary embodiment reads a grayscale section of the corresponding image data R, G, and B by reading a high 1 bit (the highest bit or the most significant bit; MSB) of the image data R, G, and B. Then, the grayscale reading unit generates two control signals SS according to the corresponding grayscale level based on the read result. When image data R, G, and B in a low grayscale section where a high 1 bit is “0”, that is, first to 128th grayscales, is input, the grayscale reading unit 361 generates a control signal SS having a low value. When image data R, G, and B in a high grayscale section where a high 1 bit is “1”, that is, 129th to 256th grayscales, is input, the grayscale reading unit 361 generates a control signal SS having a high value. Then, the grayscale reading unit supplies the control signals to the precharging units 351 respectively.

The precharging unit 351 includes a switching circuit that selects one of a plurality of precharge voltages according to the control signal SS of the grayscale reading unit 361 and outputs the selected voltage for a predetermined time. In this case, each precharge voltage corresponds to a grayscale section divided from the entire grayscale, and is adjusted to have a voltage level corresponding to a middle grayscale in the corresponding grayscale section. For example, when the entire 256 grayscales are divided into a low grayscale section that is equal to or lower than the 128th grayscale and a high grayscale section that is equal to or higher than the 129th grayscale, a low grayscale precharge voltage is adjusted to have a voltage level corresponding to about 64th grayscale and a high grayscale precharge voltage is adjusted to have a voltage level corresponding to about 192nd grayscale. For this purpose, the precharging unit 351 according to this embodiment uses a part of the gamma voltages VIN, which are output from the multiplexing units 512 and 522 of the above-mentioned grayscale voltage generator 500, as a low grayscale precharge voltage and a high grayscale precharge voltage. For example, when pixels are charged with positive voltages, the 10th gamma voltage +VIN10 is used as a low grayscale precharge voltage and the 3rd gamma voltage +VIN3 is used as a high grayscale precharge voltage. When the pixels are charged with negative voltages, the 13th gamma voltage −VIN13 is used as a low grayscale precharge voltage and the 20th gamma voltage −VIN20 is used as a high grayscale precharge voltage.

The switching circuit may include a first input terminal to which a low grayscale precharge voltage +VIN10/−VIN13 is applied, a second input terminal to which a high grayscale precharge voltage +VIN3/−VIN20 is applied, an output terminal connected to the front end of the output buffer unit 371, and a switching element that performs a switching operation between a plurality of input terminals and output terminals. In this case, when the control signal SS generated by the grayscale reading unit 361 is in a low state, that is, when the image data R, G, and B to be input is a low grayscale section that is equal to or lower than the 128th grayscale, the switching element turns on between the first input terminal and the output terminal and allows a low grayscale precharge voltage +VIN10/−VIN13 to be output. In contrast, when the control signal SS generated by the grayscale reading unit 361 is in a high state, that is, when the image data R, G, and B to be input is a high grayscale section that is equal to or higher than the 129th grayscale, the switching element turns on between the second input terminal and the output terminal and allows a high grayscale precharge voltage +VIN3/−VIN20 to be output. In this case, it is preferable that the turning-on time of the switching element be one twentieth to two twentieth of a target time required for charging the pixels. For example, since 2000 ns is required for charging the pixels in this embodiment, the precharging unit 351 turns on the switching element for about 100 to 200 ns and allows corresponding precharge voltage +VIN10/−VIN13 or +VIN3/−VIN20 to be output. After that, the output precharge voltage +VIN10/−VIN13 or +VIN3/−VIN20 is charged into a precharge capacitor Cp connected to the front end of the output buffer unit 371, and then applied to the data line D1 through the output buffer unit 371. In this case, the precharge capacitor Cp has been separately provided at the front end of the output buffer unit 371. However, the parasitic capacitance of the data line D1 may serve as the precharge capacitor Cp.

A process, where a predetermined data signal is charged in each pixel of the liquid crystal display having the above-mentioned configuration, is described below with reference to FIGS. 5 and 6.

Figure 5:
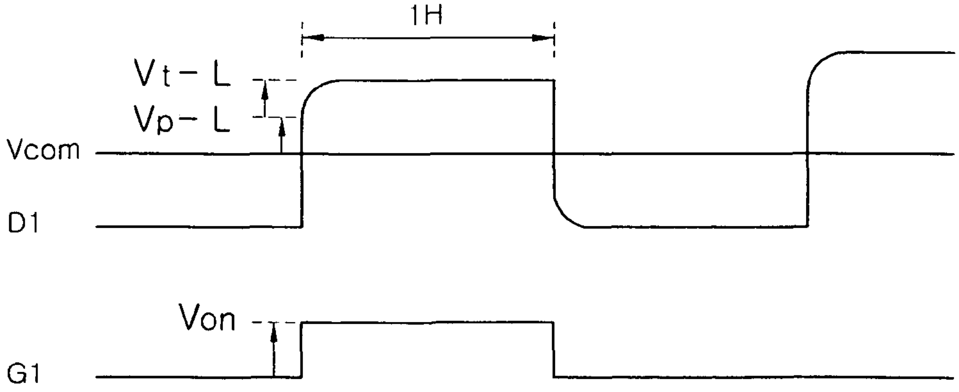
FIGS. 5 and 6 are timing charts illustrating charging process of pixels according to the embodiment of the invention.
Figure 6:
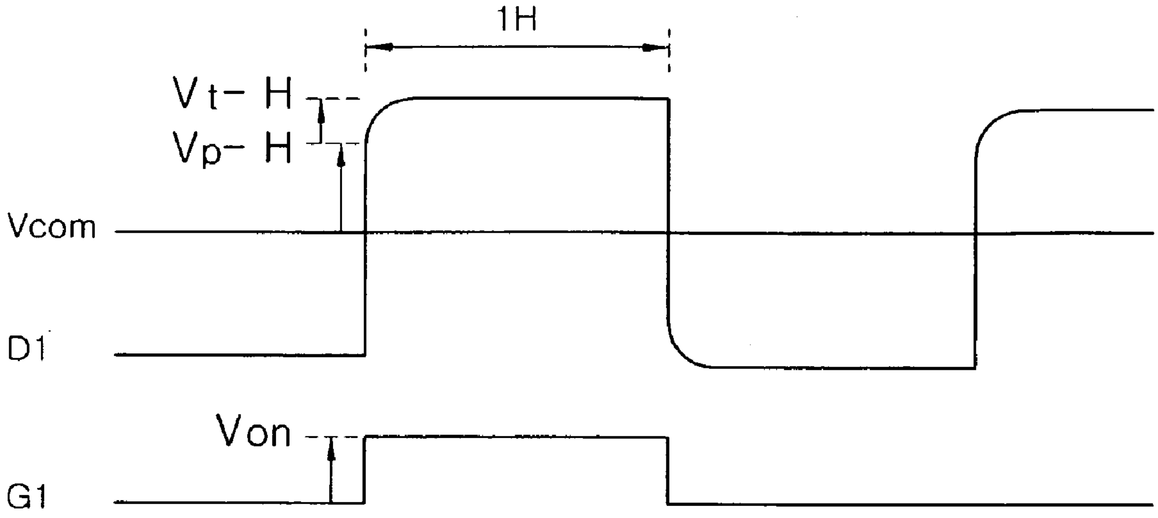

FIGS. 5 and 6 are timing charts illustrating charging process of pixels according to the embodiment of the invention.

Referring to FIGS. 5 and 6, a common voltage is applied to the common electrode of each pixel and a data voltage is applied to the pixel electrode of each pixel. Further, a polarity of the data voltage is reversed for every one horizontal period 1H by the control operation of the gate driver 200 and the data driver 300. That is, the gate driver 200 applies a gate turn-on voltage Von to one gate line G1 and turns on the pixels connected to the gate line. The data driver 300 supplies data voltages for the one line to the respective data lines. Here, the data voltage corresponds to image data R, G, and B. In this case, a precharge voltage corresponding to the grayscale section of the image data R, G, and B is supplied to the data line for a short time duration (about 100 to 200 ns) by the precharging unit 351. Then, an original data voltage is supplied to the data line for one horizontal period 1H. The precharge voltage and the data voltage may be simultaneously applied to the data line for a predetermined period. Accordingly, as shown in FIG. 5, a low grayscale precharge voltage is applied to a pixel where a high 1 bit of the image data R, G, and B is "0", and the pixel is charged up to a predetermined level Vp-L. Then, the original data voltage is applied to the pixel, and the pixel is charged up to a target level Vt-L. As shown in FIG. 6, a high grayscale precharge voltage is applied to a pixel where a high 1 bit of the image data R, G, and B is "1", and the pixel is charged up to a predetermined level Vp-H. Then, the original data voltage is applied to the pixel, and the pixel is charged up to a target level Vt-H. In this case, the low/high grayscale precharge voltage is generated by the grayscale voltage generator 500, and has short rising time (or falling time) when charging the pixels. The data voltage is generated by the decoder 341, and has long rising time (or falling time) when charging the pixels. As described above, the pixel of this embodiment is charged first with the low/high grayscale precharge voltage having short rising time, and then charged with the data voltage having long rising time, whereby the voltage rising time and the voltage falling time while charging the pixel can be shortened. That is, when the pixel is charged with a positive voltage, the rising time of the charging voltage is shortened. When the pixel is charged with a negative voltage, the falling time of the charging voltage is shortened. As a result, the charging time is substantially shortened and high driving performance can be obtained even though bias current of the data driver 300 is reduced. In addition, since the bias current of the data driver 300 is reduced, it is possible to reduce current consumption and to suppress heat generation.

The following table shows experimental results of current consumption of liquid crystal display panels employing data drivers according to a comparative example and an experimental example of the exemplary embodiment of the present invention.

[Experimental Results]

| | | Comparative example | Experimental example | Rate of change |
|---|---|---|---|---|
| I1 | Maximum | 18 mA | 7.9 mA | −127% |
| | Minimum | 10 mA | 6.2 mA | −61% |
| | I2 | 95 mA | 85 mA | −11% |

[Experimental Conditions]

1. One horizontal period H=21.7 us
2. Resistance R of Data Line=10Ω, Capacitance C of Data Line=300 pF
3. Highest gamma voltage VIN1=13.80 V, Lowest gamma voltage VIN11=0.2 V Referring to the experimental results according to this experimental example, it is shown that the bias current I1 consumed in the data driver 300 was reduced from 61% (minimum) to 127% (maximum), and the gamma reference current I2 consumed in the grayscale voltage generator 500 was reduced about 11%. As described above, current consumption was reduced at least 10% by employing the data driver including the precharging unit 351 according to this experimental example.

Although a liquid crystal display has been described as an example of various displays in the above-mentioned embodiment, the invention is not limited thereto, and is applicable to various displays where a plurality of pixels are formed in a matrix form. For example, the invention is also applicable to various displays such as a plasma display panel (PDP) and an organic EL (electro luminescence).

Although the present disclosure of invention has been described with reference to the accompanying drawings and the preferred embodiments, the invention is not limited thereto. It should be noted that various changes and modifications can be made by those skilled in the art in view of the present teachings but without departing from the technical spirit of the teachings.

As described above, according to the exemplary embodiment of the invention, a predetermined voltage is precharged according to a grayscale section of image data, and then supplied to a pixel, whereby voltage rising time and voltage falling when charging the pixel can be shortened. Therefore, even though the charging time of the pixel is shortened and bias current of the data driver is thus reduced, it is possible to obtain high driving performance. In addition, since the bias current of the data driver is reduced, overall current consumption is reduced and heat generation can also be suppressed. Further, deterioration of the display quality caused by high speed driving can be prevented because enough charging time of the pixel can be secured even during the high speed driving.

What is claimed is:

1. A display comprising:

a display panel having a plurality of pixels and on which display panel a plurality of data lines are disposed;

a data driver for supplying to respective ones of the data lines, data voltages generated by a polarity-based modulating of received input image data, wherein the input image data comprises a predetermined number of data bits per pixel that represent levels of respective and to be rendered colors of respective pixels and wherein the data driver includes:

a decoder unit operative to modulate the received input image data into data voltages for driving the display panel in accordance with a supplied polarity control signal, the decoder unit being coupled to receive a first plurality of grayscale voltages;

a precharging unit; and an output buffer unit structured and coupled to apply respective analog voltages to respective ones of the data lines, the output buffer unit having an input coupled to receive buffer driving signals respectively from the precharging unit and from the decoder unit;

wherein the precharging unit is supplied with a more significant subset of the predetermined number of data bits per pixel of the received input image data, the subset having a fewer number of bits than said predetermined number, and wherein the precharging unit is supplied with a plurality of predetermined precharge voltages, the plurality of predetermined precharge voltages being fewer in number than said first plurality of grayscale voltages, the plurality of predetermined precharge voltages not including absolute value maximums or absolute value minimums of positive polarity and negative polarity ranges covered by the polarity-based modulating of received input image data, and wherein the precharging unit includes a precharge selecting switch operative to select, from the plurality of predetermined precharge voltages, one specific precharge voltage for application to a respective data line according to identification by the more significant subset of data bits per pixel of a corresponding one of predetermined grayscale sections forming said first plurality of grayscale voltages, and the precharging selecting switch is configured to apply the selected precharge voltage, to the respective data line by way of the output buffer unit; and wherein the precharging unit further includes a grayscale reading unit that controls the precharge selecting switch to operate according to the identified grayscale section.

2. The display of claim 1, wherein the data driver further comprises a capacitor connected to the input of the output buffer unit.

3. The display of claim 1, wherein the predetermined precharge voltages are section-representing ones of a positive polarity range of grayscale voltages divided into respective sections and ones of a negative polarity range of grayscale voltages divided into respective sections.

4. The display of claim 1, further comprising a grayscale voltage generator that outputs a plurality of voltages generated by a voltage dividing unit and by gamma adjusting multiplexers for provision to the data driver, wherein the precharging units use a subset of the multiplexer output voltages as the plurality of predetermined precharge voltages.

5. The display of claim 1, wherein the precharging units are provided in plurality corresponding to the plurality of data lines, respectively.

6. The display of claim 1, wherein the display panel comprises a liquid crystal layer.

* * * * *